M. P. DOHOOD.

Improved Box for Collars &c.

No. 46,221. Patented Feby. 7, 1865.

Witnesses:
Lemuel W. Serrell
Chas. H. Smith

Inventor:
M. P. Dessoyr

UNITED STATES PATENT OFFICE.

MERRIMAN P. DORSCH, OF NEW YORK, N. Y.

IIMPROVEMENT IN PAPER-COVERED WOOD BOXES.

Specification forming part of Letters Patent No. 46,221, dated Febuary 7, 1865.

*To all whom it may concern:*

Be it known that I, MERRIMAN P. DORSCH, of the city and State of New York, have invented, made, and applied to use a certain new and useful Improvement in Boxes for Collars, &c.; and I do hereby declare the following to be a full, clear, and exact description of the said invention, reference being had to the annexed drawings, making a part of this specification, wherein—

Figure 1:
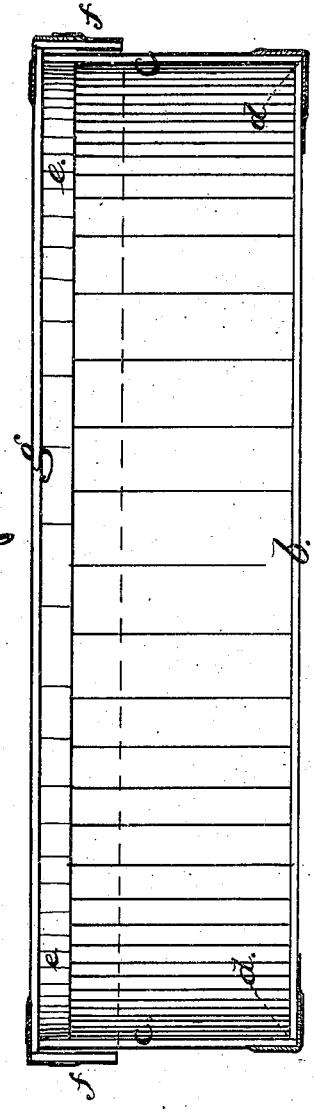
Figure 2:
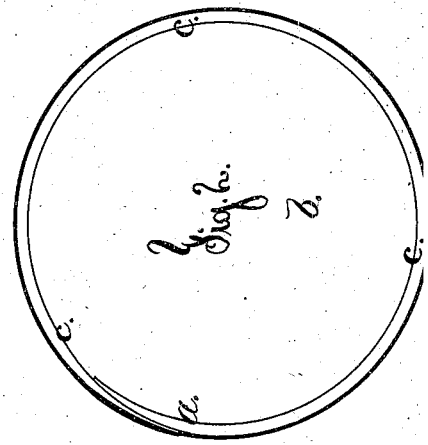

Figure 1 is a section of a large-sized collar-box, and Fig. 2 is a plan of the lower part of a smaller collar-box.

Boxes have heretofore been made of pasteboard covered with paper, and wooden boxes have been made of thin pieces of wood secured together by pins passing through the sides into the top and bottom pieces. Said boxes are often imported, and contain children's toys, &c.

The nature of my said invention consists of a box for collars and similar light articles formed from thin wood veneer, glued together and covered with paper, the box being circular, or nearly so.

The box is made of a strip of veneer, lapped and glued, as seen at *a*, Fig. 2, forming the circular sides *c* of the box. Into this the round bottom *b* is inserted, which fits the circular rim previously prepared. Around the box, at the union of the bottom and band or sides, I glue a strip of stout paper, as seen by the red lines at *d* in Fig. 1. I then cover the box with suitable paper, turning the said paper over and within the edges of the box, as represented by the blue lines at *e* in Fig. 1.

The lid is to be larger than the bottom of the box, so as to set over it, and is made with the rim *f* and circular top *g*, in the same manner as the bottom part of the box, the flat top *g*, however, is to be covered with paper to ornament the same.

A box made in this manner is a new article of manufacture that is much lighter, cheaper, and stronger than the boxes made from pasteboard, heretofore employed, and no metal is used in the box, as has heretofore sometimes been the case, so that said box is adapted to collars and similar light articles.

What I claim, and desire to secure by Letters Patent, is—

A box for collars and similar articles, made of a thin veneer of wood, with the top and bottom pieces secured to the sides by a strip of paper or similar material glued around the said edges, and the box covered with paper, as specified, the whole forming a new article of manufacture.

Dated January 7, 1865.

M. P. DORSCH.

Witnesses:
LEMUEL W. SERRELL,
CHAS. H. SMITH.